United States Patent [19]

Yarrington

[11] 3,873,442

[45] Mar. 25, 1975

[54] LOW PRESSURE PROCESS FOR SULFUR REMOVAL FROM HEATING OIL SOURCES

[75] Inventor: Robert Murphy Yarrington, Old Greenwich, Conn.

[73] Assignee: American Cyanamid Company, Stamford, Conn,

[22] Filed: Feb. 6, 1973

[21] Appl. No.: 330,168

[52] U.S. Cl.............. 208/216, 208/112, 252/465, 252/455 R
[51] Int. Cl............................................ C10g 23/02
[58] Field of Search ............. 208/216, 112; 252/465

[56] References Cited
UNITED STATES PATENTS

| | | | |
|---|---|---|---|
| 2,393,288 | 1/1946 | Byrns | 252/465 |
| 2,913,422 | 11/1959 | Reitmeier | 252/465 |
| 2,980,632 | 4/1961 | Malley et al. | 252/465 |
| 2,983,691 | 5/1961 | Richardson | 252/465 |
| 3,267,025 | 8/1966 | Gring et al. | 208/216 |
| 3,403,111 | 9/1968 | Colgan et al. | 208/216 |
| 3,471,399 | 10/1969 | O'Hara | 208/216 |

Primary Examiner—Delbert E. Gantz
Assistant Examiner—C. E. Spresser
Attorney, Agent, or Firm—William J. van Loo

[57] ABSTRACT

A process of sulfur removal from heating oil sources comprising contacting said source at 600°–700°F. and 50–250 psig with hydrogen in the presence of a cobalt-molybdenum promoted alumina carrier wherein urea was present in the promoting procedure.

10 Claims, No Drawings

LOW PRESSURE PROCESS FOR SULFUR REMOVAL FROM HEATING OIL SOURCES

CROSS-REFERENCE TO RELATED APPLICATIONS

This application is related to applications Ser. No. 330,166, Ser. No. 330,167, and Ser. No. 330,169, all filed on even date herewith.

This application relates to a process for reducing the sulfur content of heating oil sources. More particularly this invention relates to such a process wherein high sulfur removals are effected at a pressure of 50–250 psig and at a temperature of 600°–700°F. with hydrogen in the presence of specially prepared cobalt-molybdenum promoted alumina.

In recent years, an increasing awareness of environmental pollution has become manifest, particularly with respect to air pollution. This awareness has, in turn, led to recognition of pollution sources. A chief source of air pollution is the exhaust vapor emanating from internal combustion engines, i.e. automobiles. Much effort has been expended to control this pollutant, including legislation requiring reduced pollutant levels in exhaust vapor emanating from new cars. Although air pollution caused by cars has received considerable attention, air pollution by emissions from other sources has not been overlooked.

Significant contributors to air pollution are the emissions which arise in the combustion of heating oils used in furnaces. Such emissions contain oxides of sulfur which are toxic and reactive. Sulfur arises in these oils as a result of its presence in the crude oil source. The increasing number of days wherein the air quality has been reported unhealthy has led to legislation setting a maximum limit to the sulfur content in No. 2 Furnace Oil, the principal form of home heating oil. The actual limits may vary from state to state but are as low as 0.1 percent. Presently available catalysts are not capable of effecting the sulfur removal necessary to meet the 0.1 percent limit. Where the sulfur limit is 0.3 percent, the limit can just be met by fresh catalyst material using high pressure conditions but there is provided no margin for deactivation of the catalyst which inherently occurs in use. However, many hydrotreating installations are not equipped to handle high pressure reactions and in such cases the legal sulfur limits cannot be met with conventional hydrodesulfurization catalysts.

In recent years critical shortages of No. 2 Furnace Oil have arisen at times of heavy demand. The inability of catalysts to provide the necessary reduction in sulfur content in the feed stocks has contributed significantly to the shortage. Furthermore, the dwindling of our natural resources of oil supplies has forced reliance to be made on secondary sources for heating oils. These secondary sources generally have much higher sulfur contents and further complicate preparation of heating oils. Recently, a primary supplier of heating oils requested a raising of the limit of 0.3 percent sulfur, where that level was required, to 2.8 percent, almost a ten-fold increase. Such request indicates the nature of the secondary sources and of the problem of sulfur removal from heating oils. While raising the sulfur limit would apparently ease the shortage of heating oil supply, it would have disastrous effects on air quality.

The primary feed stocks from which heating oils are derived are light catalytic cycle oils and light virgin gas oils, which are generally used in admixture. The terms used to describe the feed stocks refer more specifically to the manner by which they arise and indicate their boiling range. Typically, the blend of feed stocks has a boiling range of about 240°–730°F., a gravity of about 28–32 in accordance with the method of reporting specified by the American Petroleum Industry, a basic nitrogen content of about 30–50 parts per million, and a sulfur content of about 1.3–1.5 weight percent. However, the current trend to secondary feed stocks has apparently resulted in a considerable increase in sulfur content. Because of the high sulfur content of the feed stock blend and the adverse levels of pollutants generated by combustion thereof, it is subjected to catalytic hydrotreatment which reduces sulfur content as well as basic nitrogen content so as to qualify as an acceptable heating oil. No. 2 Furnace Oil has a 90 percent boiling range of from 540° to 640°F. and a maximum sulfur content that is legal within the state sold.

The actual extent to which sulfur is removed upon hydrodesulfurization will depend upon many factors, primarily the original sulfur content of the feed stock, the temperature and pressure at which treatment is effected and the activity value of the catalyst employed in the hydrodesulfurization reaction employed. Although sulfur removal in the past was at the discretion of the suppliers, the recent legislation requires a high level of removal which is becoming increasingly difficult to achieve. Although easing of this requirement is sought by suppliers of heating oils, the increasing presence of air pollutants in our atmosphere would indicate a contrary trend.

The most widely used catalysts in the hydrodesulfurization reaction as it applies to heating oils are composites comprising cobalt oxide, molybdenum oxide and alumina, wherein alumina is the support carrying the other agents as promoters. Typically, such catalysts are effective in removing from about 70 to 90 percent of the sulfur present when generated under high pressure conditions using primary feed stocks. However, such removal can still leave sulfur levels above current limitations, especially where a 0.1 percent sulfur limit is imposed. Although the more active of conventional catalyst materials can provide the required sulfur removal in primary feed stocks, the temperature and pressure required are higher than can be employed at many existing hydrodesulfurization plants. In addition, to achieve the necessary sulfur removal, peak activity must be maintainable over extended operating times and catalyst activity declines over continued use, especially at high operating temperatures and pressures.

In view of the absence of an effective low pressure process for reducing sulfur contents of heating oils to the legal limits now required, there is a vital need for such a process. This need is all the more urgent in view of the existing low pressure equipment available but which cannot be used to provide the legal limit of sulfur in heating oils due to the ineffectiveness of known processes.

In accordance with the present invention, there is provided a process for reducing the sulfur content of a heating oil which comprises: contacting said source at a temperature in the range of about 600° to 700°F. and a pressure of about 50 to 250 pounds per square inch gauge with at least sufficient hydrogen to react with the sulfur present in said source in the presence of an activated formed catalyst composite comprising an alumina carrier obtained from a dried alumina powder promoted with from about 1 to 8 weight percent cobalt expressed as its oxide and from about 8 to 20 weight percent molybdenum expressed as its oxide, said percents being based on the weight of the activated composite, said promoting being carried out in the presence of at least 0.5 mole of urea per mole of cobalt employed and subsequent to drying of said alumina powder.

The present process provides heating oils with greatly reduced sulfur contents in spite of the fact that it is carried out at low operating pressures. The process can be varied to meet the particular needs of a given heating oil source. The process is particularly effective with No. 2 Furnace Oil wherein the sulfur content is in the range of about 0.5 to 1.0 weight percent and reduction is required to meet the legal limit set by individual states. It may also be applied to primary feed stocks of higher sulfur contents as well as other sources. In the particular case where a legal requirement of 0.1 weight percent sulfur is set, the present process operating at low pressure can meet this requirement even though prior processes employing low pressure conditions cannot. Thus, the results obtained are highly surprising for a low pressure process.

In carrying out the present process, a heating oil requiring sulfur removal is selected. The present process is capable of removing up to about 90 percent of the sulfur present under low pressure operating conditions. Accordingly, judicious selection of those heating oil sources to be processed should be made based on the final sulfur content necessary to meet a particular state legal requirement. The sulfur content of the heating oil source accordingly will vary as to the requirements to be met.

The process to be run is a catalytic hydrodesulfurization reaction wherein the sulfur present is converted to hydrogen sulfide, in which form it is readily removed from the heating oil source. The process requires hydrogen by virtue of the reaction to be preformed and the hydrogen should be supplied at least in an amount which will react with the sulfur present in the source. It is generally preferred to employ excesses of hydrogen in conformity with conventional procedures. No special requirements as to hydrogen arise in the present process.

The temperature at which hydrodesulfurization is carried out will generally be in the range of 600° to 700°F. This is the temperature range at which desired levels of sulfur removal are obtained and, accordingly, there in no advantage to be gained by operating outside the range stated.

The process operates, as previously indicated, at low operating pressure. A pressure in the range of about 50 to 250 pounds per square inch gauge (psig) is effectively used. Many of the existing hydrodesulfurization units are limited to pressures in this range and the present process enables use to be made of such units.

The catalyst used in the hydrodesulfurization process is critical. The catalyst must be a composite based on an alumina carrier and promoted with from about 1 to 8 percent cobalt and about 8 to 20 percent molybdenum, with metal percentages being by weight based on the weight of the activated composite and expressed as the oxides. In addition to this requirement, it is also necessary for the catalyst composite to have been obtained by a process wherein urea, in an amount equivalent to at least 0.5 mole of urea per mole of cobalt promoter, was employed in conjunction with promoter treatment and for promoter treatment to have been accomplished on the alumina carrier at a point subsequent to an initial drying of said carrier. The catalyst is also shaped.

In selecting the alumina carrier, conventional forms of alumina are useful, but a preferred form is precipitated alumina which has been spray-dried to a powder form. Typically such alumina may be prepared in accordance with the description appearing in U.S. Pat. No. 2,980,632, issued Apr. 18, 1961 to Malley et al. The alumina may contain small amounts of well-known stabilizers, such as up to about 10 weight percent silica. The catalyst composite to be used in the process of the present invention is to be in shaped form and once the form of dried alumina has been selected, further processing to shaped form may follow conventional procedures, provided that provision for use of urea in conjunction with promotion is made.

A first preferred procedure for preparing the desired catalyst is to prepare the alumina powder as a slurry in conjunction with a mix-mulling procedure for extrusion. In such procedure, sufficient of a water-soluble cobalt source, a watersoluble molybdenum source, and urea are furnished to the slurry so as to provide an aqueous solution thereof stable against precipitation in the amounts previously given. The furnish may be of the soluble materials which will dissolve in the slurry. Alternatively, the furnish may be in the form of separate aqueous solutions of the ingredients or combined solutions. It is generally preferred to employ a single solution of the three ingredients since the ingredients are more readily solubilized in combination. An acid may also be added, if desired, to aid in solubilization or stabilization of the furnish ingredients. Suitable acids including phosphoric, citric, tartaric, and gluconic acids, as well as others. Nitric acid may also be added to densify the final extrudate, if desired, using amounts thereof that are conventionally employed for such purpose. After the furnish is made, the slurry is mix-mulled to an extrudable consistency, extruded, and thereafter activated in accordance with conventional procedures. For a more detailed description of this procedure of catalyst preparation, see copending application Ser. No. 330,169, filed on even date herewith.

A second preferred procedure for preparing the desired catalyst is to prepare a calcined, preformed alumina carrier and effect promotion thereof. Again, a furnish of water-soluble cobalt source, water-soluble molybdenum source, and urea is provided in requisite amounts as previously indicated. The furnish is to provide an aqueous solution stable against precipitation and may be in the form of separate ingredient solutions or combined solutions. It is generally preferred to employ a single solution of the three ingredients since the three ingredients are more readily solubilized in combination. An acid may also be added, if desired, to aid in solubilization or stabilization of the furnish, as indicated above. The provision for nitric acid densification is not pertinent for a preformed carrier. The furnish may be applied to the preformed calcined carrier by any convenient method that will provide the requisite amounts of ingredients thereon. A preferred procedure is to spray the furnish solution on the carrier. For a more detailed description of this procedure of catalyst preparation, see copending application Ser. No. 330,166, filed on even date herewith.

An additional procedure for catalyst preparation is that of pore saturation of the dried alumina powder with a furnish as described above and subsequent drying and forming of the impregnated carrier by compression molding. Other methods are useful, as are known in the prior art.

It is, of course, understood that the catalyst material prepared as indicated above, is activated prior to use in the hydrodesulfurization process. Activation is heat treatment for a sufficient time at a suitable temperature to convert the promoter sources to corresponding oxides, as in known in the art. Generally, heating at a temperature in the range of about 800°–1300°F. for an hour or more is suitable.

In carrying out the process of the present invention, after having selected the heating oil to be processed, the temperature and pressure conditions to be maintained, and the particular catalyst composite to be employed, it is only necessary to select the throughput rate that will provide the sulfur removal desired. Normally the throughput rate is expressed in terms of liquid hourly space velocity and varies inversely with both the sulfur content of the oil processed and the sulfur removal desired. The present process enables desired values of space velocity to be achieved over a wide range of sulfur removal and initial sulfur contents. Of course, the actual values of space velocity will also be influenced by reactor design and will vary widely due to the various influences. However, they are readily determined by trial, as one skilled in the art can readily appreciate.

The invention is more fully illustrated by the examples which follow wherein the parts and percentages are by weight unless otherwise specifically designated.

EXAMPLE 1

Preparation of Catalyst By Mix-Mulling, Urea Provision

To 15 pound of precipitated and spray-dried alumina in a mix-muller was added a solution consisting of 2.53 pounds ammonium heptamolybdate [$(NH_4)_6 Mo_7O_{24} \cdot 4H_2O$], 2.01 pounds concentrated phosphoric acid, 4.07 pounds cobalt nitrate hexahydrate, and 1.64 pounds urea in 13 pounds of water. The alumina and promoter solution were mixed briefly and then 2 pounds of 35% nitric acid were added. The mix was mulled for 30 minutes and 70 grams of polyacrylamide extrusion aid and 3 additional pounds of alumina were added. After an additional 60 minutes of mulling, the mixture was extruded through a die containing holes 0.070 inch in diameter and cut to various lengths. The extrudates were dried at 250°F. overnight and calcined 1 hour at 1200°F. The catalyst contained 6% CoO, 12% $MoO_3$, and 3.2% P.

EXAMPLE 2

Preparation of Catalyst By Impregnating Extrudates-Urea Provision

In 125 ccs. of water were dissolved 53.7 grams of $(NH_4)_2M_2O_7$ (ammonium dimolybdate). There were then added 26.5 grams of 86.3% $H_3PO_4$, followed by 36.5 grams of urea. A clear solution resulted in about 10 minutes and 88.5 grams of $Co(NO_3)_2 \cdot 6H_2O$ were added. After 30 minutes of agitation a clear red solution was obtained. The solution contains 2 moles urea per mole of cobalt.

Calcined alumina extrudates formed into cylinders of 1/16 inch diameter from precipitated alumina and having a pore volume of 0.74 cc. per gram were employed as carrier. The solution prepared above was diluted to 220 cc. and sprayed onto 300 grams of carrier. Spraying was effected on the extrudates revolving in a gallon jar using a pressurized spray gun. Spraying was for about 5 minutes and the extrudates were rotated for an additional hour. The wet extrudates were allowed to stand overnight and then dried at 480°F. for 2 hours. The dried extrudates were then calcined at 1200°F. for 1.5 hours. The extrudates were uniformly of deep royal blue coloration and had the composition 6% CoO, 12% MoO3, 3.2% P and balance alumina. No evolution of oxides of nitrogen occurred during calcination of the impregnated support.

EXAMPLE 3

Hydrotreatment of No. 2 Furnace Oil

A No. 2 Furnace Oil with the following characteristics was employed:

| No. 2 Furnace Oil Characteristics | | |
|---|---|---|
| Gravity[1] | | 22.7 |
| Boiling Point, Initial Point | | 273°F |
| | ASTM D86 10 | 519 |
| | 30 | 550 |
| | 50 | 572 |
| | 70 | 597 |
| | 90 | 640 |
| | 95 | 667 |
| | Extreme Point | 669 |
| | Weight Percent Sulfur | 0.55 |
| | Refractive Index | 1.5272 |

[1]Reported in the manner specified by the American Petroleum Industry

Tests were run using the following conditions:

| | |
|---|---|
| Catalyst Charge | 50cc |
| Dilution Ratio[2] | 2/1 |
| Number of beds | 2 |

Presulfiding conditions-atomspheric pressure, 90%$H_2$/10%$H_2S$ mixture at 700°F. for 2 hours.

Process Conditions:

| | | |
|---|---|---|
| Liquid Hourly Space Velocity | = | 1.5 |
| Pressure, psig. | = | 200 |
| $H_2$ Flow, standard cubic feet per barrel | = | 300 |
| Temperature | = | 600°F. |
| | | 625°F. |
| | | 650°F. |

[2]2 parts catalyst to 1 part inert, impervious particles

The catalysts were presulfided and operated overnight at each process temperature to equilibrate. Oil product samples were collected and analyzed for sulfur and refractive index.

For comparative purposes, three commercial catalyst samples were also tested. These commercial samples were prepared without provision for urea therein but using the same promoter loadings as in Examples 1 and 2. All catalyst samples were nominally one-sixteenth inch in diameter with densities as listed in Table 1, which also gives the sulfur contents remaining after treatment at the specified temperature and the refractive indices of the resulting oils.

TABLE I

LOW PRESSURE HYDROTREATING NO. 2 FURNACE OIL

| CATALYST | DENSITY[a] | PROCESS TEMP., °F. | % SULFUR IN PRODUCT | REFRACTIVE INDEX, PRODUCT |
|---|---|---|---|---|
| Commercial A | 0.58 | 600 | 0.200 | 1.5186 |
|  |  | 625 | 0.167 | 1.5189 |
|  |  | 650 | 0.125 | 1.5203 |
| Commercial B | 0.54 | 600 | 0.188 | 1.5185 |
|  |  | 625 | 0.150 | 1.5181 |
|  |  | 650 | 0.105 | 1.5184 |
| Commercial C | 0.76 | 600 | 0.210 | 1.5188 |
|  |  | 625 | 0.145 | 1.5190 |
|  |  | 650 | 0.105 | 1.5204 |
| Example 1 | 0.60 | 600 | 0.180 | 1.5188 |
|  |  | 625 | 0.142 | 1.5194 |
|  |  | 650 | 0.094 | 1.5198 |
| Example 2 | 0.79 | 600 | 0.147 | 1.5179 |
|  |  | 625 | 0.110 | 1.5178 |
|  |  | 650 | 0.077 | 1.5195 |

The test sample of No. 2 Furnace Oil as can be seen is too high in sulfur content to meet Federal requirements of 0.3 percent maximum. More stringent requirements are in effect in New Jersey wherein the maximum sulfur content for oils sold in that state is 0.1 percent. Using existing low pressure hydrotreating equipment at a temperature of 650°F., it can be seen that none of the commercial catalysts can meet this requirement. However, the process of the present invention, using catalysts prepared with urea provision in conjunction with promotion, enables the requirements of the state of New Jersey with respect to sulfur content to be met.

I claim:

1. A process for reducing the sulfur content of a heating oil source which comprises: contacting said source at a temperature in the range of about 600° to 700°F. and a pressure in the range of about 50 to 250 pounds per square inch gauge with at least sufficient hydrogen to react with the sulfur present in said source in the presence of an activated formed catalyst composite comprising an alumina carrier obtained from a dried alumina powder promoted with from about 1 to 8 weight percent cobalt expressed as its oxide and from about 8 to 20 weight percent molybdenum expressed as its oxide, said percents being based on the weight of the activated composite, said promoting being carried out by use of an aqueous solution of a cobalt compound which upon activation provides cobalt oxide, a molybdenum compound which upon activation provides molybdenum oxide and at least 0.5 mole of urea per mole of cobalt employed and subsequent to drying of said alumina powder.

2. The process of claim 1 wherein said oil is a No. 2 Furnace Oil.

3. The process of claim 1 wherein said temperature is in the range of 650°–700°F.

4. The process of claim 1 wherein said pressure is in the range of 100–250 pounds per square inch gauge.

5. The process of claim 1 wherein said catalyst is prepared by a mix-mulling procedure.

6. The process of claim 1 wherein said catalyst is prepared by subsequent promotion of a preformed calcined extrudate.

7. The process of claim 1 wherein said catalyst contains 6 weight percent cobalt expressed as its oxide and 12 weight percent molybdenum expressed as its oxide.

8. The process of claim 5 wherein said catalyst contains 6 weight percent cobalt expressed as its oxide and 12 weight percent molybdenum expressed as its oxide.

9. The process of claim 6 wherein said catalyst contains 6 weight percent cobalt expressed as its oxide and 12 weight percent molybdenum expressed as its oxide.

10. The process of claim 1 wherein said alumina is stabilized with silica.

* * * * *